US008032315B2

(12) United States Patent
Richer et al.

(10) Patent No.: US 8,032,315 B2
(45) Date of Patent: Oct. 4, 2011

(54) SYSTEM AND METHOD OF CORRELATING THE ORIENTATION OF A TRI-AXIAL ACCELEROMETER

(75) Inventors: Paul Richer, Everett, WA (US); Terry G. Morey, Renton, WA (US); Ferdinand Laurino, Seattle, WA (US); Sidney Lin, Bothell, WA (US); Paul Heydron, Everett, WA (US); Cy Y. Kawasaki, Renton, WA (US); Robert Maañnao, Seattle, WA (US)

(73) Assignee: Fluke Electronics Corporation, Everett, WA (US)

( * ) Notice: Subject to any disclaimer, the term of this patent is extended or adjusted under 35 U.S.C. 154(b) by 401 days.

(21) Appl. No.: 12/324,682

(22) Filed: Nov. 26, 2008

(65) Prior Publication Data

US 2010/0131227 A1     May 27, 2010

(51) Int. Cl.
    *G01H 17/00*     (2006.01)
    *G01H 1/00*     (2006.01)
    *G06F 19/00*     (2011.01)
    *G06F 17/40*     (2006.01)

(52) U.S. Cl. ............ 702/56; 73/487; 73/570; 73/865.8; 73/865.9; 702/34; 702/150; 702/187

(58) Field of Classification Search ................... 73/1.01, 73/1.37, 1.75, 1.76, 1.77, 1.78, 1.82, 66, 73/432.1, 487, 570, 865.8, 865.9; 702/1, 702/33, 34, 56, 85, 104, 105, 127, 150, 152, 702/187, 189; 715/200, 700, 764, 771, 781, 715/782, 809, 810
See application file for complete search history.

(56) References Cited

U.S. PATENT DOCUMENTS

| 7,312,871 | B2 * | 12/2007 | Henry | 356/400 |
|---|---|---|---|---|
| 7,460,977 | B2 * | 12/2008 | Stromberg et al. | 702/150 |
| 2004/0252302 | A1 * | 12/2004 | Henry | 356/400 |
| 2008/0201097 | A1 * | 8/2008 | Stromberg et al. | 702/94 |

* cited by examiner

*Primary Examiner* — Edward Cosimano
(74) *Attorney, Agent, or Firm* — Perkins Coie LLP

(57) ABSTRACT

A system and method for analyzing a device that includes a mass configured for motion. The system includes a tri-axial accelerometer disposed to detect acceleration vectors of the device and to output three channels of acceleration data, and a user interface receiving the three channels of acceleration data. The user interface is configured to correlate the three channels of acceleration data with a reference frame defined by three orthogonal axes intersecting at a vertex, and includes a display and a selector. The display shows sets of options that represent dispositions of the device with respect to gravity, placements of the tri-axial accelerometer with respect to the device, and orientations of the tri-axial accelerometer with respect to the device. The selector selects one device disposition option, one tri-axial accelerometer placement option, and one tri-axial accelerometer orientation option.

15 Claims, 5 Drawing Sheets

SYSTEM AND METHOD OF CORRELATING THE ORIENTATION OF A TRI-AXIAL ACCELEROMETER

TECHNICAL FIELD

The present disclosure relates to correlating the axial orientation of a multi-axial accelerometer, which is mounted on a device to be analyzed, with a user interface that is analyzing the device.

BACKGROUND

Acceleration, i.e., the rate of change of velocity, is a vector that is defined by both direction and magnitude. Typically, the magnitude of acceleration is expressed in meters per second per second ($m/s^2$) or popularly in terms of g-force. A conventional single-axis accelerometer measures acceleration that is directed along an axis with which the single-axis accelerometer is aligned. A conventional tri-axial accelerometer measures acceleration in a three-dimensional space using orthogonally oriented sensors to define the direction of acceleration that is detected. Tri-axial accelerometers can detect acceleration and/or gravity induced reaction forces including vibration, imbalance or shock.

The effects of gravity and acceleration are indistinguishable to an accelerometer. As a consequence, the output of a tri-axial accelerometer has an offset due to gravity. This means that a tri-axial accelerometer at rest on the earth's surface will indicate 1 g along a vertical direction. For the tri-axial accelerometer to measure vertical acceleration due to motion alone there must be an adjustment to compensate for the offset due to gravity. At the same time, there is no adjustment for the tri-axial accelerometer to measure horizontal acceleration due to motion.

Accurate measurement of acceleration depends on the correlation of the output from a tri-axial accelerometer with the orientation of the tri-axial accelerator relative to gravity and relative to a device on which the tri-axial accelerometer is mounted. Given that a large number of options are available for mounting a tri-axial accelerometer on a device, and that each mounting option requires the selection of an appropriate correlation, the potential for inaccurate acceleration measurements is also large.

DETAILED DESCRIPTION

Specific details of embodiments according to the present disclosure are described below with reference to analysis systems and methods for analyzing a device. Devices that can be analyzed according to embodiments of the present disclosure include a mass in motion. The term "motion" can encompass rotation, reciprocation, oscillation, gyration, combinations thereof, or any other continuous, alternating, periodic, and/or intermittent change to the location or arrangement of a mass. The devices can include, for example, electric motors, generators, internal combustion engines, turbines, compressors, pumps, actuators, propellers, wheels, gears, pulleys, shafts, and combinations thereof.

The term "coupled" may encompass various types of relationships between two or more components or features. Further, the phrase "electrically coupled" can encompass a path conductively linking two or more components or features, the phrase "magnetically coupled" can encompass two or more components or features linked by a magnetic field, or the phrase "mechanically coupled" may encompass a physical association or structural linking of two or more components or features. Moreover, several other embodiments of the disclosure can have configurations, components, features or procedures different than those described in this section. A person of ordinary skill in the art, therefore, will accordingly understand that the disclosure may have other embodiments with additional elements, or the disclosure may have other embodiments without several of the elements shown and described below with reference to FIGS. 1-5.

Figure 1:
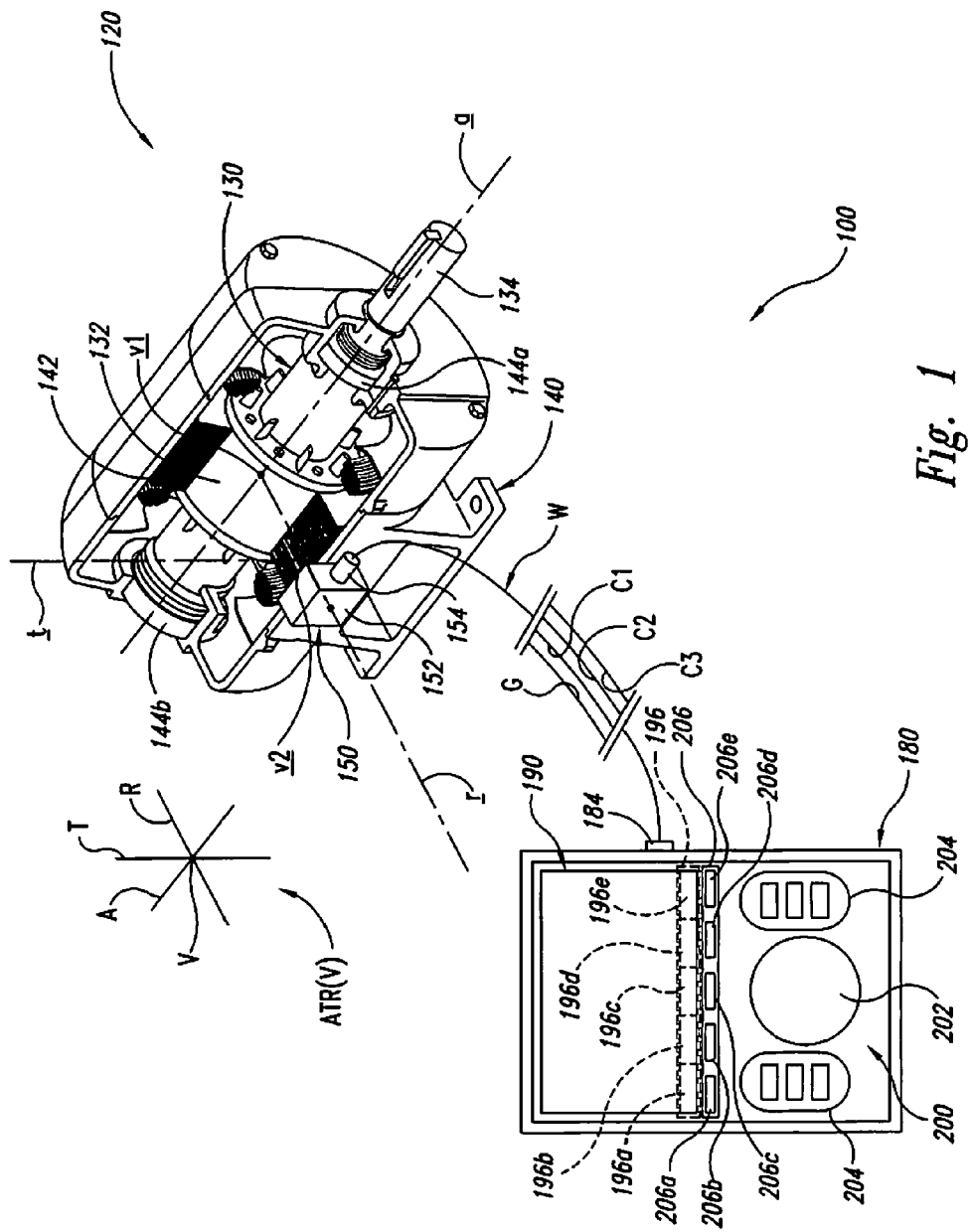
FIG. 1 is a schematic illustration of an analysis system according to an embodiment of the present disclosure.

FIG. 1 is a schematic illustration of an analysis system 100 according to an embodiment of the present disclosure. In this embodiment, the analysis system 100 includes an electric motor 120, i.e., the device being analyzed in this embodiment, a tri-axial accelerometer 150 placed on the electric motor 120, and a user interface 180 electrically coupled with the tri-axial accelerometer 150.

The electric motor 120 can include a rotating body 130 supported relative to a stationary housing 140. In the embodiment shown in the FIG. 1, the rotating body 130 includes rotor 132 fixed to a shaft 134. The stationary housing 140 supports a stator 142, which can be magnetically coupled with the rotor 132, and bearings 144a and 144b that can be mechanically coupled to the shaft 134. The bearings 144a and 144b can include, for example, sliding bearings, anti-friction bearings, a fluid, or another suitable device or substance that supports the rotating body 130 for relative motion with respect to the stationary housing 140.

An axis a extends axially along the rotating body 130, an axis r extends radially with respect to the rotating body 130, and an axis t extends tangentially with respect to the rotating body 130. The axes a, r and t are mutually orthogonal and all, some or none of the axes can intersect at one or more vertexes. For example, according to an embodiment of the present disclosure shown in FIG. 1, the axial axis a extends concentrically with a center of the shaft 134, the radial axis r extends radially from the center of the shaft 134 perpendicular to the axial axis a, and the tangential axis t extends tangentially from a periphery of the rotor 132 perpendicular to the radial axis r. Thus, according to the embodiment shown in FIG. 1, the axes a, r and t are mutually orthogonal, the radial axis r intersects the axial axis a at a first vertex v1, and the tangential axis t intersects the radial axis r at a second vertex v2. A reference frame ART(V) can be constructed of orthogonal axes A, R and T, which are parallel to axes a, r and t, respectively, and intersect at a single common vertex V.

The tri-axial accelerometer 150 can include a case 152 and an output port 154 for an electrical coupling to the tri-axial accelerometer 150. The case 152 can be shaped and sized to facilitate placement on the electric motor 120. As it is used herein, the terms "place" or "placement" refer to a mechanical coupling that links the tri-axial accelerometer 150 and the device to be analyzed. According to embodiments of the present disclosure, placement of the case 152 on the stationary housing 140 can be accomplished by integral forming, integral coupling, e.g., welding, fastening, e.g., with a bolt or a magnet, adhering, or any suitable method that conveys acceleration forces to the tri-axial accelerometer 150. The output port 154 can include an electric plug, a fiber optic connection, a wireless transmitter, or anything suitable for outputting channels of acceleration data from the tri-axial accelerometer 150 via electric signals, radio frequency signals infrared signals, or any suitable method of communication.

According to the embodiment of the present disclosure shown in FIG. 1, the case 152 of the tri-axial accelerometer 150 is placed on the stationary housing 140, along the radial axis r. In addition to placing the tri-axial accelerometer 150 at various other locations on the stationary housing 140, it is envisioned that the tri-axial accelerometer 150 could also be placed elsewhere on the electric motor 120 including, but not limited to, the stator 142, bearings 144a and 144b, the rotor 132, or the shaft 134. Acceleration data can be communicated wirelessly when the tri-axial accelerometer 150 is placed on the rotating body 130.

Figure 2:
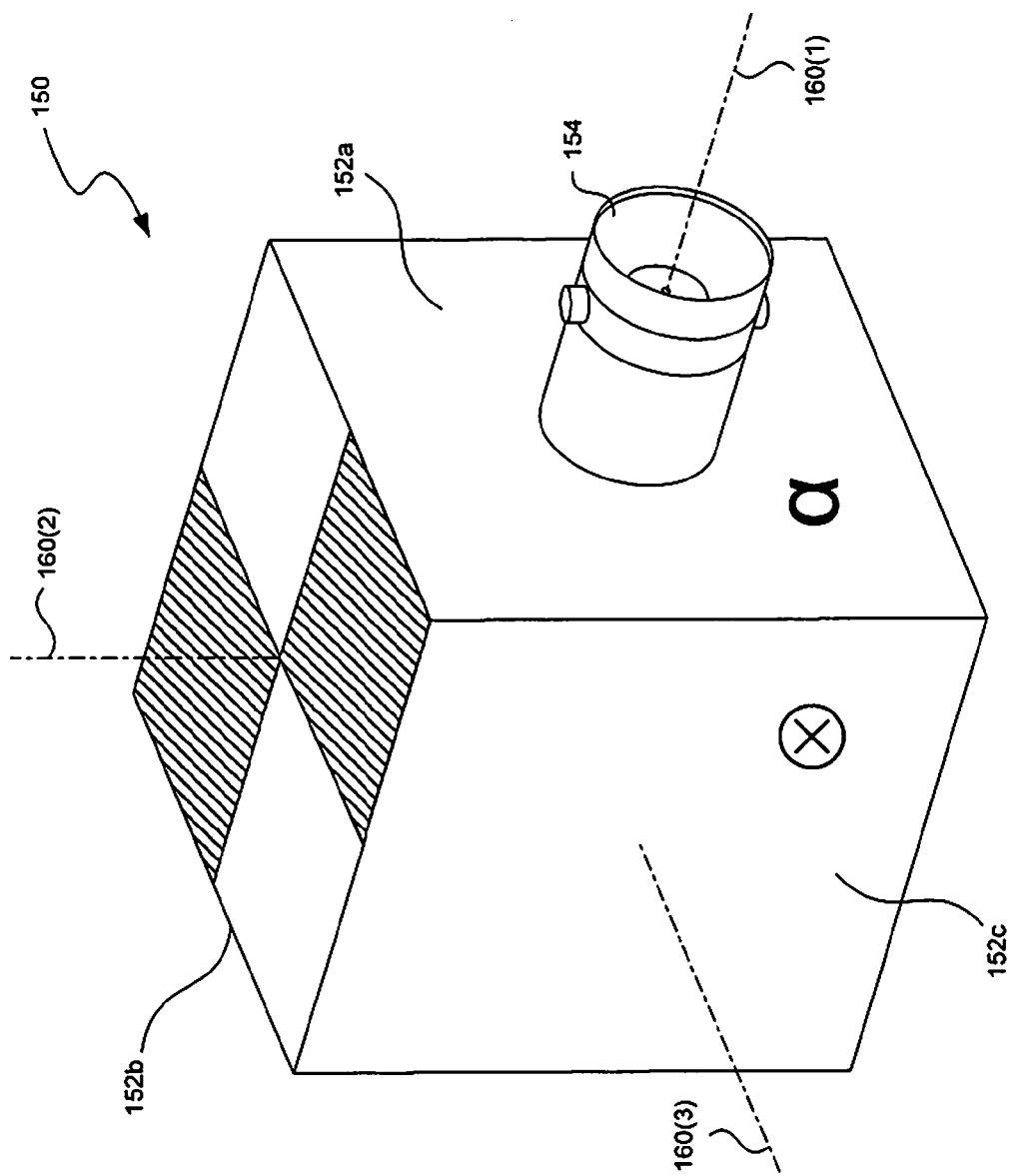
FIG. 2 is a schematic illustration of a tri-axial accelerometer according to an embodiment of the present disclosure.

Referring additionally to FIG. 2, the tri-axial accelerometer 150 detects acceleration along three relatively orthogonal accelerometer axes 160(1), 160(2) and 160(3), and outputs respective first, second and third channels of acceleration data via the output port 154. According to the embodiment of the present disclosure shown in FIG. 2, the case 152 of the tri-axial accelerometer 150 can be configured as a hexahedron having a first pair of rectangular opposite facets 152a, a second pair of rectangular opposite facets 152b, and a third pair of rectangular opposite facets 152c (only one facet of each pair is shown in FIG. 2). The first accelerometer axis 160(1) projects from the first facet 152a, the second accelerometer axis 160(2) projects from the second facet 152b and a third accelerometer axis 160(3) projects from the third facet 152c.

Referring additionally to FIG. 2, the tri-axial accelerometer 150 includes coding so as to define the accelerometer axes 160(1), 160(2) and 160(3). In particular, the coding includes different identifiers on different facets of the case 152 such that an identifier corresponds to one of the facets and therefore corresponds to one of the axes 160(1), 160(2) and 160(3). Examples of identifiers include, but are not limited to, colors, symbols, patterns, lights, reflectors, alpha-numeric characters, or combinations thereof. In the embodiment shown in the FIG. 2, the first facet 152a includes an alpha-numeric character a on a red background, the second facet 152b includes a symbol ⊗ on a green background, and the third facet 152a includes a pattern of alternating light and dark squares. After placing the tri-axial accelerometer 150 on the electric motor 120, the coding associates each of the accelerometer axes 160(1), 160(2) and 160(3) with a respective axis of the reference frame ART(V). Accordingly, for example, the first accelerometer axis 160(1) can be associated with axis A, which by virtue of being parallel to axis a, will detect axial acceleration forces of the electric motor 120; the second accelerometer axis 160(2) can be associated with axis R, which by virtue of being parallel to axis r, will detect radial acceleration forces of the electric motor 120; and the third accelerometer axis 160(3) can be associated with axis T, which by virtue of being parallel to axis t, will detect tangential acceleration forces of the electric motor 120. Of course, different placements of the tri-axial accelerometer 150 on the electric motor 120 can result in different associations of the accelerometer axes 160(1), 160(2) and 160(3) with the axial, radial and tangential acceleration forces of the electric motor 120.

According to the embodiment of the present disclosure shown in FIG. 1, a cable W electrically couples the tri-axial accelerometer 150 with the user interface 180. The cable W can include four conductors including one ground conductor G and three data channel conductors C1, C2 and C3. The number of conductors can be decreased or increased. For example, the number of conductors can be decreased if the acceleration data is transmitted digitally or if there are fewer than three channels of acceleration data, or the number of conductors can be increased if the there are more than three channels of acceleration data. The conductors in the cable W can include metallic conductors, e.g., copper wire, for transmitting electrical signals, optical fibers for transmitting light signals, or any other suitable conductor that transmits a signal.

According to the embodiment of the present disclosure shown in FIG. 1, the user interface 180 includes an input port 184 that is electrically coupled with the cable W to receive the acceleration data from the tri-axial accelerometer 150. The user interface 180 includes a display 190 and a selector 200. The selector 200 can include one or more user controls such as a knob 202 and/or sets of push buttons 204 and 206. The knob 202 can be rotated among a plurality of positions to alternately select functions of the user interface 180. The first set of push buttons 204 can turn ON and OFF control parameters of the user interface 180. The second set of buttons 206, which are individually indicated 206a-206e, can be "soft keys" that perform different roles depending on the designated option that is indicated on adjacent portions 196, which are individually indicated 196a-196e, of the display 190.

In order to provide a meaningful analysis of the acceleration data, the user interface 180 correlates the three channels of data with the reference frame ART(V). Accordingly, for example, the first data channel can be correlated with axis A and therefore the axial acceleration forces of the electric motor 120; the second data channel can be associated with axis R and therefore the radial acceleration forces of the electric motor 120, and the third data channel can be associated with axis T and therefore the tangential acceleration forces of the electric motor 120. Of course, different placements of the tri-axial accelerometer 150 on the electric motor 120 can result in different correlations of the data channels with the axial, radial and tangential acceleration forces of the electric motor 120.

An embodiment of a method according to the present disclosure for correlating the user interface 180 with the tri-axial accelerometer 150 will now be described with reference to FIGS. 3-5. According to the embodiment of the present disclosure shown in FIG. 3, the user interface 180 can be configured by the selector 200 to prompt the user to select from a set of disposition options for the electric motor 120, e.g., whether the shaft 134 is disposed horizontally or vertically with respect to gravity. To select a disposition option for the electric motor 120, the user can press the soft key 206 designated with the appropriate option. In the embodiment shown in FIG. 3, the user would press the soft key 206e to select the representation in the display portion 196e of the horizontal disposition option. Compensation of the acceleration that is detected along one of the axes a, r or t due to the force of gravity can be based on the selection of the disposition option of the electric motor 120.

Figure 4:
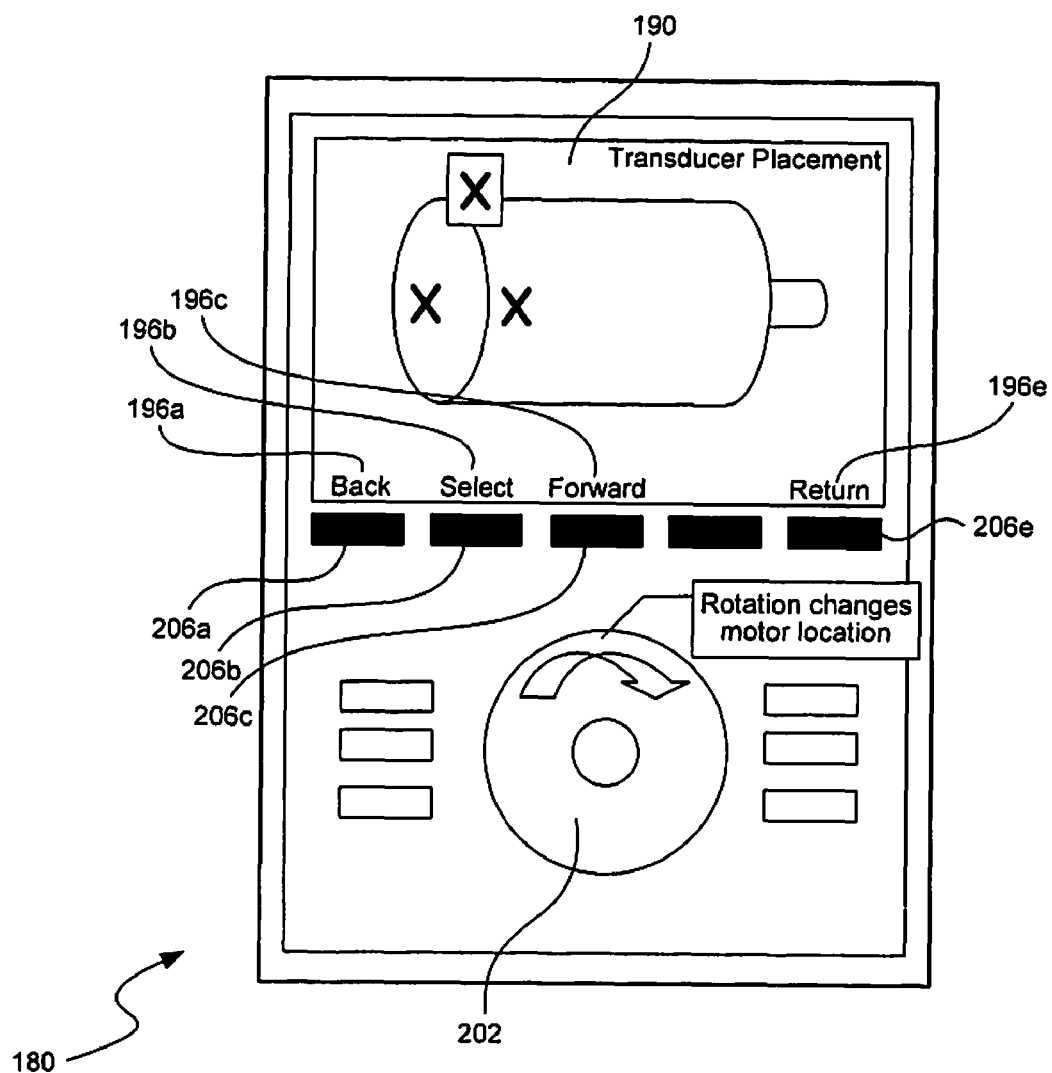
FIG. 4 is a schematic illustration of a user interface in a second configuration according to an embodiment of the present disclosure.

According to the embodiment of the present disclosure shown in FIG. 4, the user interface 180 can be configured by the selector 200 to prompt the user to select from a set of placement options for the tri-axial accelerometer 150 with respect to the electric motor 120, e.g., whether the tri-axial accelerometer 150 is placed on an axial end face of the electric motor 120, on a side of the electric motor 120, or on top of the electric motor 120. To select a placement option for the tri-axial accelerometer 150, the user can press the soft key 206 designated with the appropriate option. In the embodiment shown in FIG. 4, the user could press either of the soft keys 206a or 206c to scroll through the representations of the placement options shown on the display 190 until the representation of the appropriate placement option is displayed, and then press the soft key 206b to select the appropriate placement option.

Figure 5:
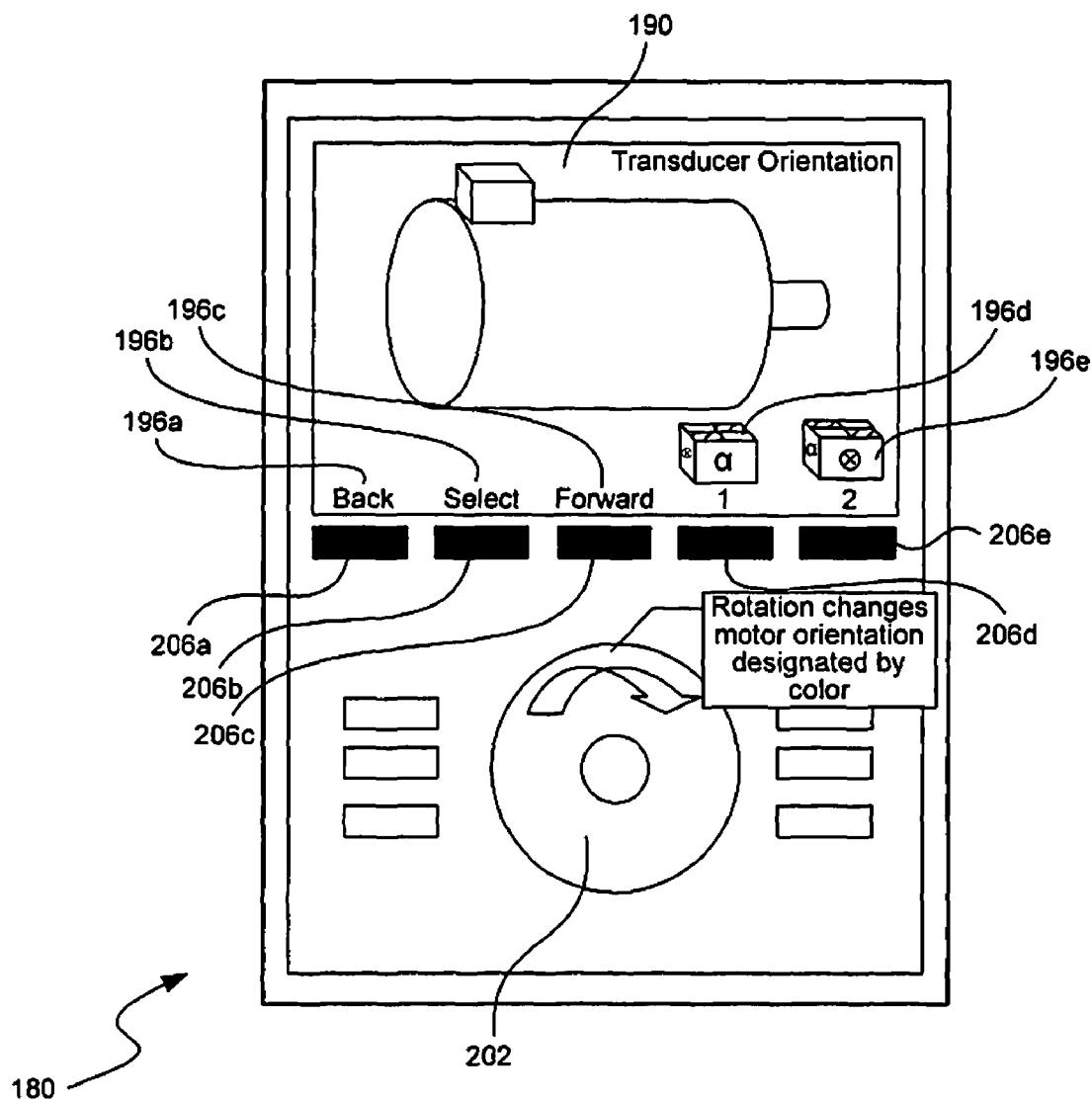
FIG. 5 is a schematic illustration of a user interface in a third configuration according to an embodiment of the present disclosure.

According to the embodiment of the present disclosure shown in FIG. 5, the user interface 180 can be configured by the selector 200 to prompt the user to select from a set of orientation options of the tri-axial accelerometer 150 with respect to the electric motor 120. The appropriate orientation option is selected based on correspondence between the visual appearance of the coding on the tri-axial accelerometer 150, as it is placed on the electric motor 120, and a representation on the display 190 of the matching coding option. To select an orientation option for the tri-axial accelerometer 150, the user can press the soft key 206 designated with the appropriate option. In the embodiment shown in FIG. 5, the user could press either of the soft keys 206a or 206c to scroll through the representations of the orientation options shown on the display 190 until the representation of the orientation option is displayed, and then press either of the soft keys 206b or 206d to select the appropriate orientation option.

Figure 3:
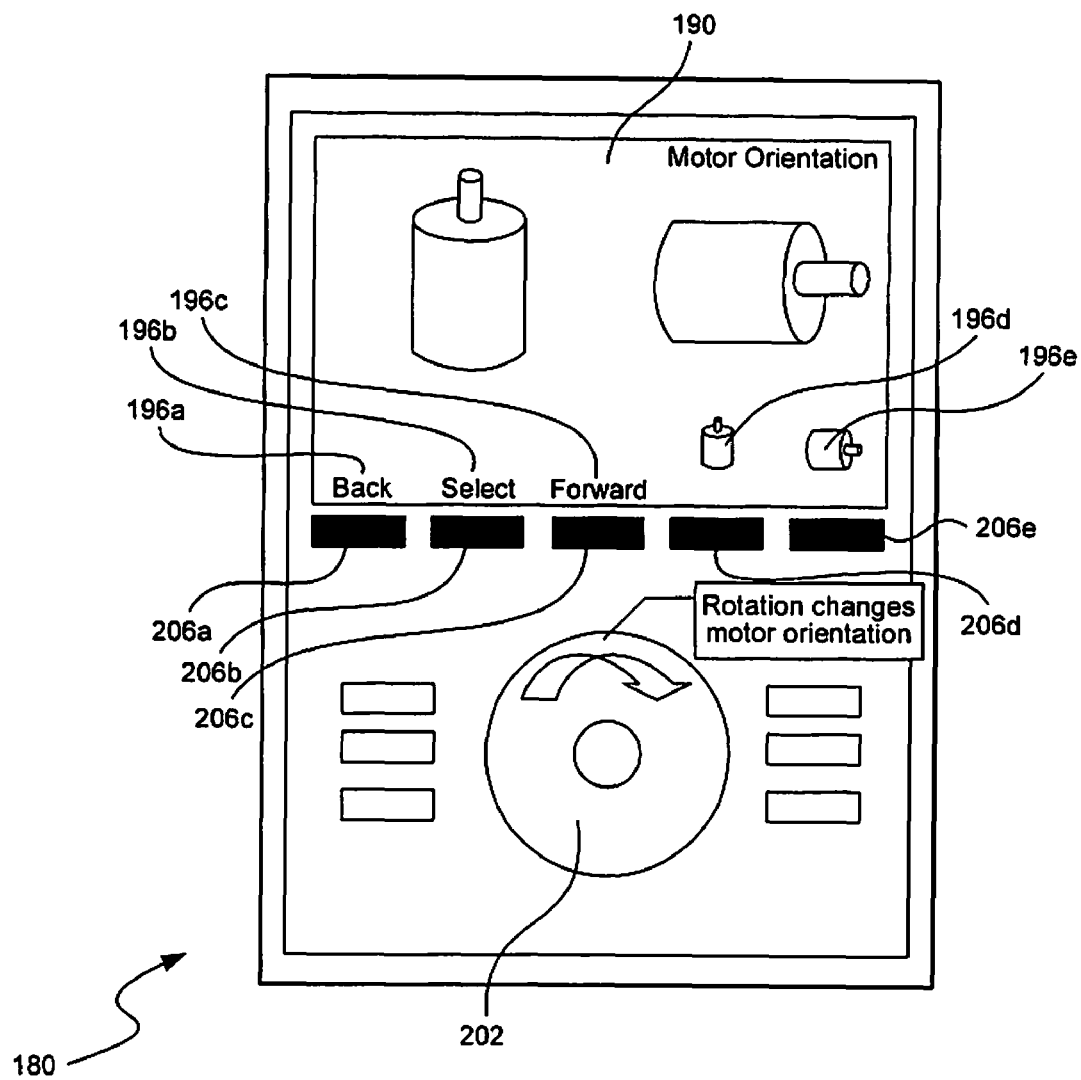
FIG. 3 is a schematic illustration of a user interface in a first configuration according to an embodiment of the present disclosure.

Embodiments of the process according to the present disclosure, such as the process illustrated by the embodiments shown in FIGS. 3-5, correlate the acceleration data received at the user interface 180 with the orientation of the tri-axial accelerator relative to gravity and with the placement and orientation of the device on which the tri-axial accelerometer is mounted. Thus, the device can be accurately analyzed regardless of the choices for mounting the tri-axial accelerometer on the device.

According to some embodiments of the present disclosure, an orthogonal tri-axial accelerometer is correlated with an orthogonal three-axes reference frame of a device. Other embodiments according to the present disclosure can be used with different accelerometers. For example, accelerometers can detect acceleration along one, two or more than three axes. Multi-axial accelerometers can have axes that are orthogonally related, or the axes can have different angular relationships. Accelerometers according to the present disclosure can be implemented by different transducer types including, but not limited to, capacitive, piezoelectric, piezoresistive, Hall Effect, magnetorestrictive, thermal, optical, or any other suitable transducer that outputs a signal in response to detecting acceleration.

According to some embodiments of the present disclosure, additional sets of options may be presented by the user interface. For example, the user interface can be configured by the selector to prompt the user to select the type of device that is being analyzed, e.g., an electric motor, a pump, etc. The user interface can also be configured by the selector to prompt the user to select a manufacturer and/or model of the device that is being analyzed.

Specific details of the embodiments of the present disclosure are set forth in the description and in the figures to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the present disclosure.

Unless the context clearly requires otherwise, throughout the description and the claims, the words "comprise", "comprising", and the like are to be construed in an inclusive sense, as opposed to an exclusive or exhaustive sense; that is to say, in the sense of including, but not limited to. Additionally, the words "herein", "above", "below", and words of similar connotation, when used in the present disclosure, shall refer to the present disclosure as a whole and not to any particular portions of the present disclosure. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the present disclosure provided herein can be applied to systems other than the analysis systems described above. The features of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the embodiments in the present disclosure may vary considerably in their implementation details, while still being encompassed by the invention disclosed herein.

The terminology used in the Detailed Description is intended to be interpreted in its broadest reasonable manner, even though it is being used in conjunction with a detailed description of certain specific embodiments according to the present disclosure. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the present disclosure, unless the above Detailed Description section explicitly defines such terms. Accordingly, the actual scope of the invention encompasses not only the embodiments disclosed in the present disclosure, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A system for analyzing a device including a mass configured for motion, comprising:
    a tri-axial accelerometer disposed to detect acceleration vectors of the device, the tri-axial accelerometer outputting three channels of acceleration data; and a user interface receiving the three channels of acceleration data, the user interface being configured to correlate the three channels of acceleration data with a reference frame defined by three orthogonal axes intersecting at a vertex, the user interface including—
a display configured to (1) show a set of options representing dispositions of the device with respect to gravity, (2) show a set of options representing placements of the tri-axial accelerometer with respect to the device, and (3) show a set of options representing orientations of the tri-axial accelerometer with respect to the device, and
a selector configured to select one device disposition option, one tri-axial accelerometer placement option, and one tri-axial accelerometer orientation option.

2. The system of claim 1, wherein the device comprises an axis and the acceleration vectors are generated by the mass rotating on the axis.

3. The system of claim 2, wherein the device disposition options consist of a vertical axis device disposition representation and a horizontal axis device disposition representation.

4. The system of claim 2, wherein the tri-axial accelerometer placement options comprise an axial tri-axial accelerometer placement representation and a radially spaced tri-axial accelerometer placement representation.

5. The system of claim 4, wherein the selector is configured to select a horizontal axis device disposition representation from the device disposition options, and the tri-axial accelerometer placement options comprise a vertically spaced radial tri-axial accelerometer placement representation and a horizontally spaced radial tri-axial accelerometer placement representation.

6. The system of claim 1, wherein the tri-axial accelerometer comprises coding defining three orthogonal axes intersecting at a vertex.

7. The system of claim 6, wherein the selector is configured to select a tri-axial accelerometer orientation representation that corresponds to the coding of the tri-axial accelerometer.

8. The system of claim 6, wherein the coding comprises three different identifiers disposed on three orthogonal surfaces of the tri-axial accelerometer.

9. The system of claim 8, wherein the three different identifiers comprise at least one of colors, symbols, patterns, lights, reflectors, and alpha-numeric characters.

10. A system comprising:
a device including an axis and a mass rotating on the axis;
a tri-axial accelerometer disposed on the device and including coding defining first, second and third orthogonal axes intersecting at a vertex, the tri-axial accelerometer detecting acceleration vectors of the device and outputting three channels of acceleration data; and
a user interface receiving the three channels of acceleration data, the user interface being configured to correlate the three channels of acceleration data with (1) an axial direction of the device, (2) a radial direction with respect to the axis of the device, and (3) a tangential direction with respect to rotation of the device, the user interface including—
a display configured to (1) show a set of options representing horizontal and vertical dispositions of the device with respect to gravity, (2) show a set of options representing axial and radial placements of the tri-axial accelerometer with respect to the device, and (3) show a set of options representing orientations of the tri-axial accelerometer with respect to the device, and
a selector configured to (1) select one of the horizontal and vertical disposition representations, (2) select one of the axial and radial tri-axial accelerometer placement representations, and (3) select a tri-axial accelerometer orientation representation that corresponds to the coding of the tri-axial accelerometer.

11. The system of claim 10, wherein the coding comprises different identifiers corresponding to each of the first, second and third orthogonal axes, and the identifiers comprise at least one of colors, symbols, patterns, lights, reflectors and alpha-numeric characters.

12. The system of claim 10, wherein the display is configured to further show a set of options representing various devices.

13. A method of analyzing a device including at least one mass configured for motion, comprising:
coding a tri-axial accelerometer to define first, second and third orthogonal axes intersecting at a vertex;
disposing the tri-axial accelerometer to detect acceleration vectors of the device;
sending three channels of acceleration data from the tri-axial accelerometer to a user interface;
correlating the three channels of acceleration data with a reference frame including three orthogonal axes intersecting at a vertex, the correlating including—
displaying on the user interface a set of options representing dispositions of the device with respect to gravity;
selecting one device disposition option;
displaying on the user interface a set of options representing placements of the tri-axial accelerometer with respect to the device;
selecting one tri-axial accelerometer placement option;
displaying on the user interface a set of options representing orientations of the tri-axial accelerometer with respect to the device; and
selecting one tri-axial accelerometer orientation option.

14. The method of claim 13, wherein the coding comprises differently identifying the first, second and third orthogonal axes.

15. The method of claim 13, further comprising detecting three-dimensional acceleration vectors.

* * * * *

UNITED STATES PATENT AND TRADEMARK OFFICE
CERTIFICATE OF CORRECTION

PATENT NO.        : 8,032,315 B2                                  Page 1 of 1
APPLICATION NO.   : 12/324682
DATED             : October 4, 2011
INVENTOR(S)       : Paul Richer et al.

It is certified that error appears in the above-identified patent and that said Letters Patent is hereby corrected as shown below:

Title Page, Item (75), Inventors, delete "Maañnao" and insert --Maañao--

Title Page, Item (73), Assignee, delete "Electronics"

Signed and Sealed this
Twenty-first Day of February, 2012

David J. Kappos
*Director of the United States Patent and Trademark Office*